United States Patent Office 3,308,101
Patented Mar. 7, 1967

3,308,101
NOVEL POLYMERIC MATERIALS
Carol K. Ikeda, Wallingford, Pa., assignor to E. I. du Pont de Nemours and Company, Wilmington, Del., a corporation of Delaware
No Drawing. Filed Sept. 24, 1963, Ser. No. 311,242
8 Claims. (Cl. 260—78.4)

This invention relates to triazine copolymers and is more particularly directed to triazine copolymers of recurring monomeric units having the structures

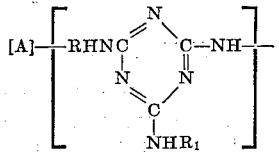

and (1)

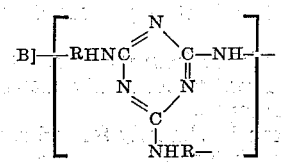

where:
R can be a straight or branched chain alkylene radical of 4 through 14 carbon atoms, phenylene, xylylene,

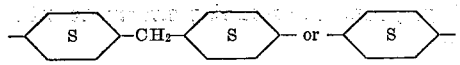

and $R_1$ can be a straight or branched chain alkyl radical of 2 through 18 carbon atoms; an aryl radical; an aryl radical substituted with alkoxy of 1 through 5 carbon atoms, alkyl of 1 through 5 carbon atoms, fluorine, chlorine or bromine; a $$-(CH_2)_a-O-(CH_2)_b-CH_3$$

radical or a $-(CH_2)_a-S-(CH_2)_b-CH_3$ radical where $a$ is a number 2 through 8 and $b$ is a number 0 through 8.

In the polymer, monomer units [A] and [B] can be present in any ratio to each other and can be arranged in a random or ordered manner.

Preparation of the polymers

The copolymers of this invention can be prepared by bringing together a monocyanamide of the formula $R_1-NH-CN$ (where $R_1$ is as defined in Formula 1) with a biscyanamide of the formula $$NC-HN-R-NH-CN$$

(where R is as defined in Formula 1) and then thermally polymerizing them.

The monocyanamide reactant can be prepared by the reaction of a monoamine with cyanogen bromide according to the following equation:

$$2R_1-NH+CNBr \rightarrow R_1-NH-CN+R_1NH_2+Br$$

This reaction is described in greater detail in R. Kitawaki, M. Yomashita and K. Sugino, J. Chem. Soc. Japan, 78, 567 (1957).

The dicyanamide reactant can be prepared by the reaction of a diamine with cyanogen bromide according to the equation:

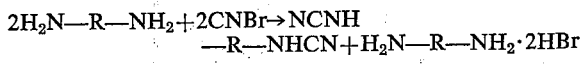

The preparation of biscyanamides according to this method is described in Journal of Organic Chemistry, 26, 4122 (1960).

To prepare the polymers, a monocyanamide or blend of monocyanamides is brought into contact with a biscyanamide or blend of biscyanamides, and the mixture is then heated to initiate polymerization.

The reactants should preferably be present in a biscyanamide:monocyanamide mole ratio of 50:50 to 95:5 to each other. As the proportion of monocyanamide is increased, the flexibility of the resulting polymer is also increased due to the relative decrease in the number of cross-linking sites provided by the —NHR— group in portion [B] of Formula 1. Thus, by varying the monocyanamide:biscyanamide ratio, one skilled in the art can control the flexibility of the polymer being produced, and so adapt the polymer to a particular use.

If the reactants are solids, they should preferably be premelted and then mixed to insure homogeneity. After they have been mixed, the mixture is heated to a temperature of 60° C.–350° C. The precise temperature of polymerization will, of course, depend upon the reactants used and the dimensions of the film to be cast. The optimum polymerization temperature can be easily determined by one skilled in the art. If polymerization is carried out at lower temperatures, a post-cure of 60 minutes at 200° C. is preferably used.

The polymerization time is naturally tied to the polymerization temperature, the lower temperatures requiring longer periods. In the upper temperature ranges, polymerization is, generally speaking, almost instantaneous.

If quick polymerization is desired, the reaction can be catalyzed with basic substances such as amines, guanidine and piperidine.

If slow polymerization is desired, the reaction can be retarded by using such substances as benzoic acid, phtaalic anhydride, isophthalic acid, N-methyl pyrrolidone, ethyl phosphate or quinoline.

The amount of retarders or accelerators will obviously depend on the rate of polymerization desired. Generally speaking, one can use from 1 to 5% by weight of such substances.

Utility

The polymers of this invention are clear, thermally stable, rigid materials which are resistant to most organic solvents.

These properties make them highly suitable for use as organic solders for sealing side seams in metal cans, as adhesives for laminating such things as glass fibers, and paper base objects, and as adhesives for metal to metal bonds. They can also be used as impregnating, encapsulating and potting agents for materials which require inert coatings.

Carbon can be incorporated into the polymers, which can then be used as conductive coatings in various electrical applications.

The nature of the polymers is such that no special processing or equipment is required for their application. When they are used as solders or adhesives, it is necessary only that the reactants be heated to bring them into a liquid state and that they be brought together, with further heating, to initiate polymerization. When the polymers are used to make conductive coatings or used as encapsulating agents, the reactants are first mixed and spread upon the material to be coated which is then heated to bring about polymerization.

In all these uses, polymerization takes place without pitting or scorching the resulting coating, which ordinarily happens when homopolymers of biscyanamides are made.

Preferred for these uses are copolymers of Formula 1 where R is an alkylene radical and $R_1$ is an alkyl radical Most preferred are the copolymers of Formula 1 where R and R₁ are dodecamethylene and dodecyl respectively.

*Examples*

This invention will be more easily understood and readily practiced by referring to the following illustrative examples:

EXAMPLE 1

5.5 parts of cyanogen bromide and 175 parts of a 50/50 ether-ethanol mixture are combined in a flask kept at 0–5° C. A solution of 10 parts of dodecamethylenediamine in 110 parts of the 50/50 ether-ethanol mixture is added to this mixture dropwise over a three-hour period.

The resulting diaminedihydrobromide precipitate is then filtered off and the filtrate concentrated, under vacuum, to a volume of about 20 parts.

Two hundred and fifty parts of ice water are then added and the mixture refrigerated overnight.

The resulting crystals of dodecamethylene biscyanamide are collected by filtration and dissolved in ethyl acetate. Anhydrous calcium sulfate is then added to this solution, which is allowed to stand for an hour. The calcium sulfate is then filtered off and the filtrate evaporated to dryness in a stream of air to yield 12.1 parts of dodecamethylene biscyanamide.

The biscyanamides in the following list can be prepared in a similar fashion by reacting the listed diamines with cyanogen bromide, in equimolar proportions, to give the corresponding product:

| | |
|---|---|
| m-phenylenediamine | m-phenylenedicyanamide |
| m-xylylenediamine | m-xylylenedicyanamide |
| 1,4-cyclohexylenediamine | 1,4-cyclohexylenecyanamide |

EXAMPLE 2

Fifty-three parts of cyanogen bromide are dissolved in 600 parts of anhydrous ether. This solution is chilled to 0° C. and while being stirred, a solution of 185 parts of dodecylamine in 400 parts of anhydrous ether is added, dropwise, over a four-hour period at such a rate that the temperature of the reaction mass does not exceed 5° C.

The resulting mixture is stirred for an additional one-half hour and then filtered. The filtrate is treated with a small amount of decolorizing charcoal and then re-filtered.

The ether is stripped off under vacuum to give 60 parts of white, solid dodecylcyanamide.

The cyanamides listed in the following table can be prepared in a similar fashion by reacting equimolar proportions of the listed monoamines and cyanogen bromide, to give the corresponding cyanamide:

| | |
|---|---|
| aniline | phenylcyanamide |
| chloroaniline | chlorophenylcyanamide |
| 3-methoxypropylamine | 3-methoxypropylcyanamide |

EXAMPLE 3

Dodecamethylenebiscyanamide (1.4 parts) and dodecylcyanamide (0.6 part) are premelted and then mixed.

This liquid mixture is then applied to the seam of a semifrabricated metal can preheated to about 300° C. Polymerization is instantaneous. The seam of the can is closed with a tough, impervious, durable, solvent-resistant coating of a polymer having recurring monomeric units of the structures

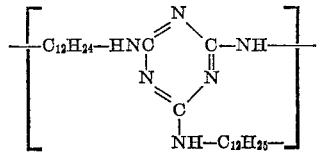

and

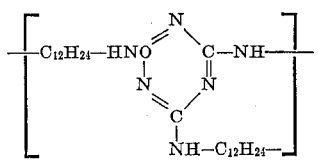

A one-half inch lap joint is formed between two metal plates by coating the outer edge of each, on the under side, with the same mixture. The metal plates are clamped together and heated in an oven at 150° C. for 10 minutes and then post-cured for one hour at 200° C. The resulting bond has a shear strength of about 2700 p.s.i.

EXAMPLE 4

Ten parts of hexamethylene biscyanamide and 1.9 parts of butylcyanamide are comelted and thoroughly mixed. This mixture is spread as a thin film over a glass plate which is then heated at 100° C. for one hour. The resulting film is then post-cured for one hour at 200° C.

The film is stripped from the base. It is clear, tough, durable and resistant to commonly encountered solvents, but is somewhat brittle.

A polymer can be similarly formed and cast using 10 parts of hexamethylene biscyanamide and 5.9 parts of butylcyanamide as reactants. The resulting film is also clear, tough, durable and resistant to commonly encountered solvents, but in considerably more flexible.

Both polymers have recurring monomeric units of the structure

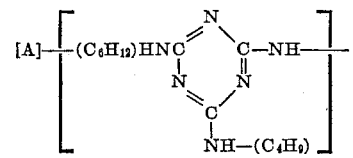

and

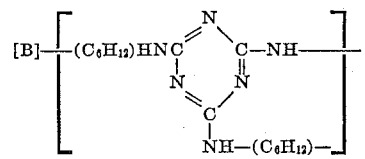

The first copolymer prepared is composed predominantly of [B] units; the second is predominantly [A] units.

EXAMPLE 5

Ten parts of m-phenylenedicyanamide, dissolved in a minimum amount of dimethylformamide, and 3.6 parts of phenylcyanamide are blended together and cast on a glass plate, which is then heated to 150° C. for two hours. The polymer is then post-cured for one hour at 200° C. to give a film composed of recurring monomeric units of the structures

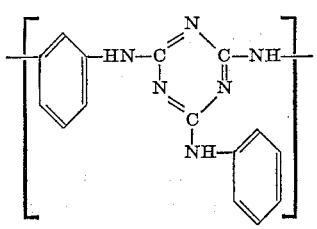

and

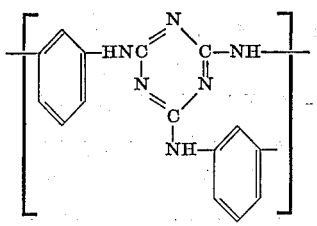

Metachlorophenylcyanamide can be used in place of phenyl cyanamide, in equimolar proportions, and polymerized and cast in the same fashion to give a film having similar characteristics.

EXAMPLE 6

Ten parts of bis(4,4'-dicyanamidocyclohexyl)methane and 2.2 parts of 3-methoxypropylcyanamide are blended together and cast as a thin film on a glass plate, which is then heated for one hour at 150° C. and post-cured for one hour at 200° C.

The resulting polymeric film is clear, resistant to conventional organic solvents, hard, and has recurring monomeric units of the structures

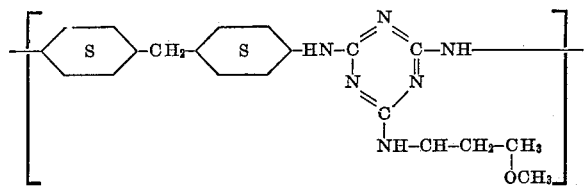

and

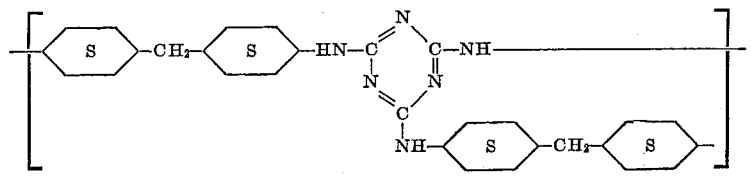

Copolymers having the following listed substituents can be similarly prepared by reacting the corresponding mono- and dicyanamides in about 2 to 1 molar ratios:

| R | $R_1$ |
|---|---|
| 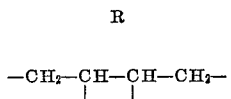 | 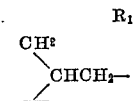 |
| 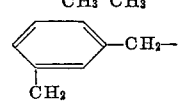 | 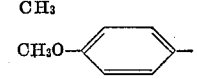 |
| 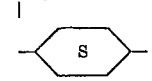 | 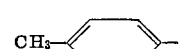 |
|  | 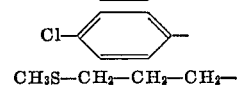 |
|  | $CH_3S-CH_2-CH_2-CH_2-$ |

What is claimed is:
1. A solid triazine copolymer of recurring monomeric units having the structures

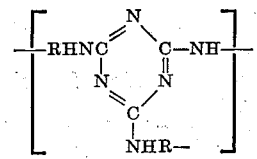

and

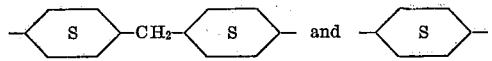

where R is selected from the group consisting of straight chain alkylene radicals of 4 through 14 carbon atoms, branched chain alkylene radicals of 4 through 14 carbon atoms, phenylene, xylylene, and $R_1$ is selected from the group consisting of straight chain alkyl radicals of 2 through 18 carbon atoms; branched chain alkyl radicals of 2 through 18 carbon atoms; aryl radicals; aryl radicals substituted with a radical selected from the group consisting of alkoxy radicals of 1 through 5 carbon atoms, alkyl radicals of 1 through 5 carbon atoms, fluorine, chlorine and bromine; $-(CH_2)_a-O-(CH_2)_b-CH_3$ radicals and $-(CH_2)_a-S-(CH_2)_b-CH_3$ radicals where $a$ is a number 2 through 8 and $b$ is a number 0 through 8.

2. A solid triazine copolymer of recurring monomeric units having the structures

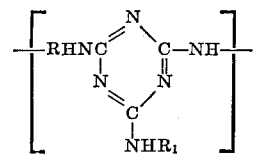

and

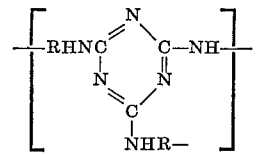

where R is an alkylene radical of 4 through 14 carbon atoms,
and $R_1$ is an alkyl radical of 2 through 18 carbon atoms.

3. A solid triazine copolymer of recurring monomeric units having the structures

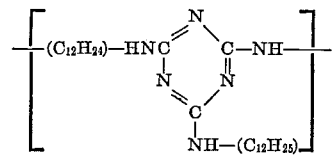

and

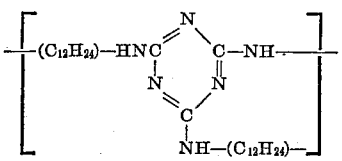

4. An article bearing a film of a triazine copolymer according to claim 1.

5. An article bearing a film of a triazine copolymer according to claim 2.

6. An article bearing a film of a triazine copolymer according to claim 3.

7. A thermally polymerizable composition comprising a biscyanamide of the formula NC—HN—R—NH—CN where R is selected from the group consisting of straight chain alkylene radicals of 4 through 14 carbon atoms, branched chain alkylene radicals of 4 through 14 carbon atoms, phenylene, xylylene,

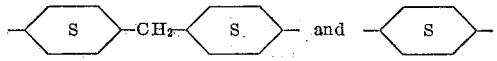

and a monocyanamide of the formula $R_1$—NH—CN where $R_1$ is selected from the group consisting of straight chain alkyl radicals of 2 through 18 carbon atoms; branched chain alkyl radicals of 2 through 18 carbon atoms; aryl radicals, aryl radicals substituted with a radical selected from the group consisting of alkoxy radicals of 1 through 5 carbon atoms, alkyl radicals of 1 through 5 carbon atoms, fluorine, chlorine and bromine;

$$-(CH_2)_a-O-(CH_2)_b-CH_3$$

radicals and —$(CH_2)_a$—S—$(CH_2)_b$—$CH_3$ radicals where $a$ is a number 2 through 8 and $b$ is a number 0 through 8, the biscyanamide:monocyanamide mole ratio in said composition being about 50:50 to 95:5.

8. A thermally polymerizable composition comprising 2 moles of dodecamethylene biscyanamide and 1 mole of dodecylcyanamide.

No references cited.

JOSEPH L. SCHOFER, *Primary Examiner.*

H. I. CANTOR, *Assistant Examiner.*